United States Patent [19]
Kramer

[11] Patent Number: 5,990,429
[45] Date of Patent: Nov. 23, 1999

[54] SUBASSEMBLY WITH AN ELECTRIC SWITCH

[75] Inventor: Markus Kramer, Spaichingen, Germany

[73] Assignee: Marquardt GmbH, Rietheim - Weilheim, Germany

[21] Appl. No.: 08/844,666

[22] Filed: Apr. 21, 1997

[30] Foreign Application Priority Data

Apr. 24, 1996 [DE] Germany .............................. 196 16 249

[51] Int. Cl.⁶ .................................................. H01H 9/04
[52] U.S. Cl. ........................................ 200/296; 200/302.2
[58] Field of Search ............................. 200/302.2, 302.1, 200/296

[56] References Cited

U.S. PATENT DOCUMENTS

| | | | |
|---|---|---|---|
| 2,814,703 | 11/1957 | Martin | 200/302.2 |
| 2,950,373 | 8/1960 | Grover et al. | 200/302.2 X |
| 3,231,706 | 1/1966 | Waldorf | 200/302.2 X |
| 3,940,585 | 2/1976 | Schaad | 200/302.2 X |
| 4,342,894 | 8/1982 | Scott et al. | 200/302.1 X |
| 4,788,387 | 11/1988 | Kasegi et al. | 200/302.1 X |

FOREIGN PATENT DOCUMENTS

| | | |
|---|---|---|
| 0536056 | 4/1993 | European Pat. Off. . |
| 8904332 U | 8/1989 | Germany . |
| 4015587 | 11/1990 | Germany . |
| 9105624 U | 8/1991 | Germany . |
| 29510010 U | 11/1995 | Germany . |
| 4442971 | 1/1996 | Germany . |

*Primary Examiner*—Rennee S. Luebke
*Attorney, Agent, or Firm*—Venable; George H. Spencer; Catherine M. Voorhees

[57] ABSTRACT

A subassembly having a main housing and an electric switch arranged within the main housing. The main housing has a wall provided with an opening and the switch has a switch housing and an actuating element. The switch is arranged within the main housing such that the actuating element projects through the opening in the wall so as to extend exteriorly of the main housing and thus be actuatable from the exterior of the main housing. The wall has a first contact surface in the region of the opening and the switch housing has a second contact surface in the region of and surrounding the actuating element. The two contact surfaces are in pressure contact with each other when the switch is installed in the main housing with the actuating element of the switch projecting through the opening, thereby eliminating the need for an additional seal between the contact surfaces of the main housing and the switch housing. The subassembly can be used, for example, in a steering wheel lock, an ignition lock, a door lock or the like in a motor vehicle, or it can be used in domestic appliances or in machine tools.

16 Claims, 9 Drawing Sheets

SUBASSEMBLY WITH AN ELECTRIC SWITCH

BACKGROUND OF THE INVENTION

The invention relates to a subassembly with a housing, in particular to an electric and/or electronic and/or mechanical subassembly. for use in a steering wheel lock, an ignition lock, a door lock or the like in a motor vehicle, or for use in domestic appliances or machine tools.

Electric or electronic subassemblies, including if appropriate those equipped with mechanical elements, having a housing are used, for example, in motor vehicles. A subassembly of this type may be a steering wheel lock located in the vicinity of the steering wheel, an ignition lock, a lock subassembly located in the car door for central locking, or the like. In order to establish the position of the lock, the locking or unlocking position or the like, there are in the subassembly electric switches whose switching signals encode the corresponding position.

The electric switches in the subassembly are generally snap-action or microswitches which are provided with their own switch housing. These switches are arranged inside the housing of the subassembly and are operated via movable actuating elements which act on the operating member of the switch. There are often actuating elements outside the housing, so that further transmission elements have to be articulated to the actuating element, one of these transmission elements in turn being guided into the housing, via an opening made in a housing wall, for the purpose of operating the switch.

It can be seen immediately that an arrangement of this type of additional transmission elements is complicated and susceptible to faults. The interior of the housing must often be protected against the action of moisture, dust and the like, so that sealing means are additionally necessary between the opening in the housing and the movable transmission elements. It has been shown that, in spite of these sealing means, the penetration of pollutants of this type into the housing cannot be completely eliminated. This results in the risk that the subassembly will fail prematurely.

The invention is based on the object of simplifying the operation of an electric switch which is located in the housing of the subassembly by means of an actuating element arranged outside the housing, in particular to achieve good sealing at the opening into the housing using simple means.

BRIEF DESCRIPTION OF THE INVENTION

This object is achieved in the case of a subassembly of the generic type by providing a subassembly having a main housing and an electric switch arranged within the main housing. The main housing has a wall provided with an opening and the switch has a switch housing and an actuating element. The switch is arranged within the main housing such that the actuating element projects through the opening in the wall so as to extend exteriorly of the main housing and thus be actuatable from the exterior of the main housing. The wall has a first contact surface in the region of the opening and the switch housing has a second contact surface in the region of and surrounding the actuating element. The two contact surfaces are in pressure contact with each other when the switch is installed in the main housing with the actuating element of the switch projecting through the opening, thereby eliminating the need for an additional seal between the contact surfaces of the main housing and the switch housing.

Further features of the invention are described below.

The main switch in the housing of the subassembly is preferably a snap-action or microswitch with an operating member which is designed as a linearly movable plunger. Fitted to the plunger is a sealing cap configured in the manner of a bellows, which can be fastened by means of a collar on the switch housing by rolling. Part of the collar forms the surface of the switch housing which rests on that surface of the housing wall surrounding the opening. This surface of the housing wall surrounding the opening is the rim of the opening in the housing wall.

The outer surface of the collar is designed to run obliquely, in the manner of a truncated cone, while the opening has an approximately circular cross section. The opening has a diameter which is slightly smaller than the largest external diameter of the collar. As a result, the collar then rests with a contact pressure on the surface of the housing wall surrounding the opening, in particular no additional sealing means being needed on this surface.

According to a further feature, the surface surrounding the opening can be lengthened with an extension, reaching into the interior of the housing, on the housing wall, in order to increase the sealing surface. If appropriate, the extension can additionally rest with its end face on the surface of the switch housing which is approximately perpendicular to the direction of motion of the plunger. If desired, there can be a further resilient sealing element between the end face of the extension and this surface of the switch housing.

Located in the housing is a retainer for the switch. The switch housing is preferably latched into this retainer, in that retaining pins located on the switch housing engage into corresponding latch holders having latching or snap-action hooks. The latch holder for the retaining pins can be designed in each case from two latching or snap-action hooks which are approximately triangular with their tips located opposite one another, and an approximately semicircular stop.

As a mounting aid for the switch, there is located on the retainer for the switch housing an insertion bevel which is designed in the manner of a rib. During assembly, the switch housing is then placed onto the insertion bevel such that the operating member passes through the opening in the housing. Subsequently, as a result of the action of pressure, the switch housing slides along the insertion bevel, the retaining pins, after overcoming a type of pressure point between the tips of the latching or snap-action hooks, being fixed in the latch holder by the stop and the two latching or snap-action hooks.

According to a further feature of the sealing of the opening, in particular as protection against spray water or the like, one can, if it is believed to be desirable or necessary, following assembly the switch housing on the retainer provide a potting compound, at least in the region of the opening.

The advantages which are achieved with the invention are in particular that it is possible to dispense with an additional transmission element, leading from the outside into the housing, for the operation of the switch, as well as other moving and restoring elements. Instead, the switch is operated directly by the actuating element located outside the housing. This results in a simpler and thus also more cost effective construction of the subassembly, which is additionally simpler to assemble.

The switch can be arranged such that it can be latched in the housing with low tolerances, which once more improves the ease of assembly.

In addition, the further advantage results that the positioning accuracy and the interrogation accuracy for the operation of the switch, in particular as a result of the self centering in the latch holder, is increased without increasing the complexity.

Further, good sealing of the interior of the housing of the subassembly against the penetration of moisture, water, dust, exhaust gases or the like is achieved, without additional sealing means being necessary. This leads in turn to cost savings and furthermore contributes to increasing the functional reliability of the subassembly.

BRIEF DESCRIPTION OF THE DRAWINGS

An exemplary embodiment of the invention is illustrated in the drawings and is described in more detail below. In the drawings.

DETAILED DESCRIPTION OF THE PREFERRED EMBODIMENT

Figure 1:
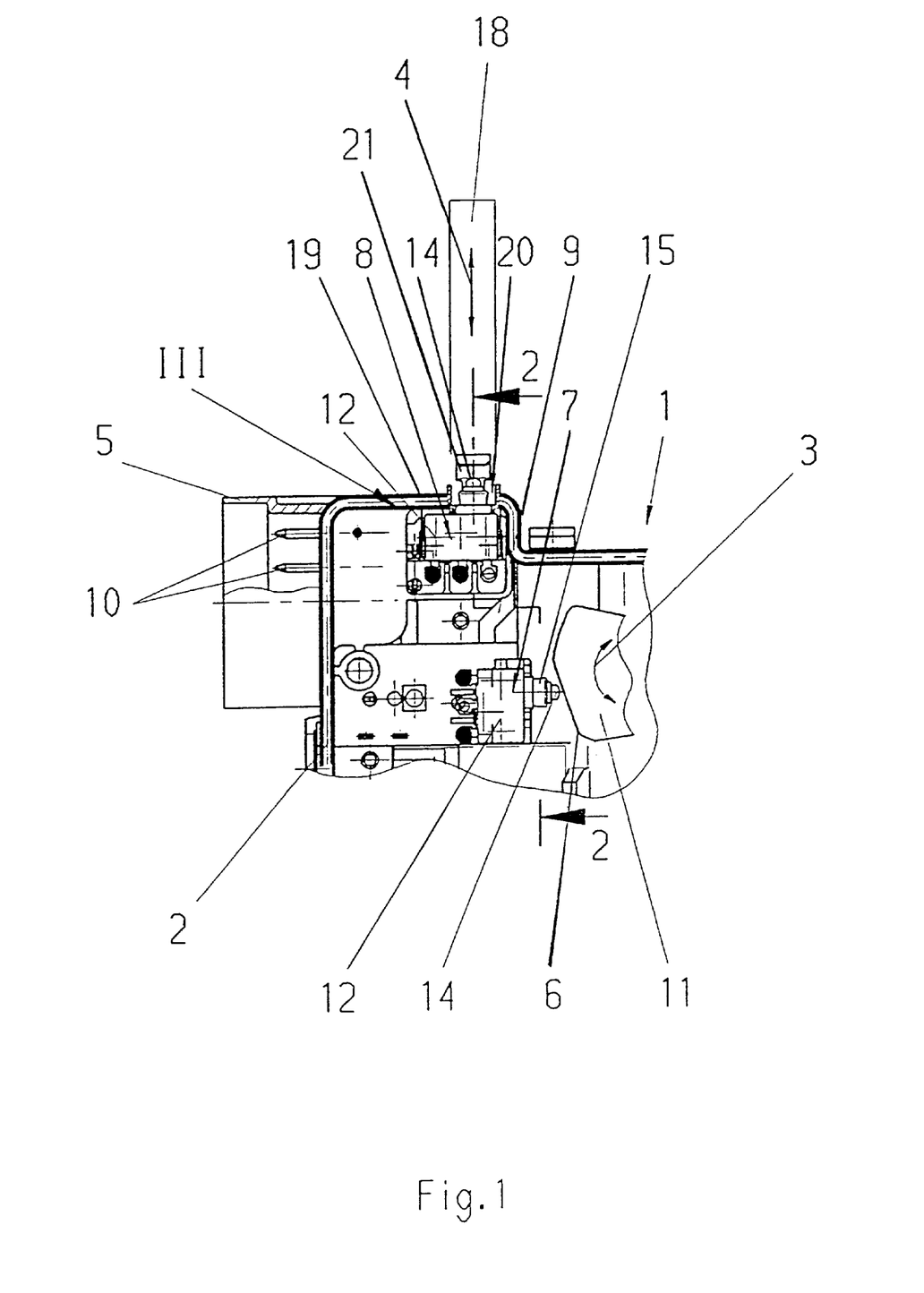
FIG. 1 shows a section through a housing, for example for a lock subassembly of a central locking system in a motor vehicle.

FIG. 1 shows a subassembly 1 which is designed in the manner of an electrical component carrier and is arranged in a housing 2. This subassembly is, for example, a lock subassembly for a central locking system which is employed in the door of a motor vehicle.

Figure 2:
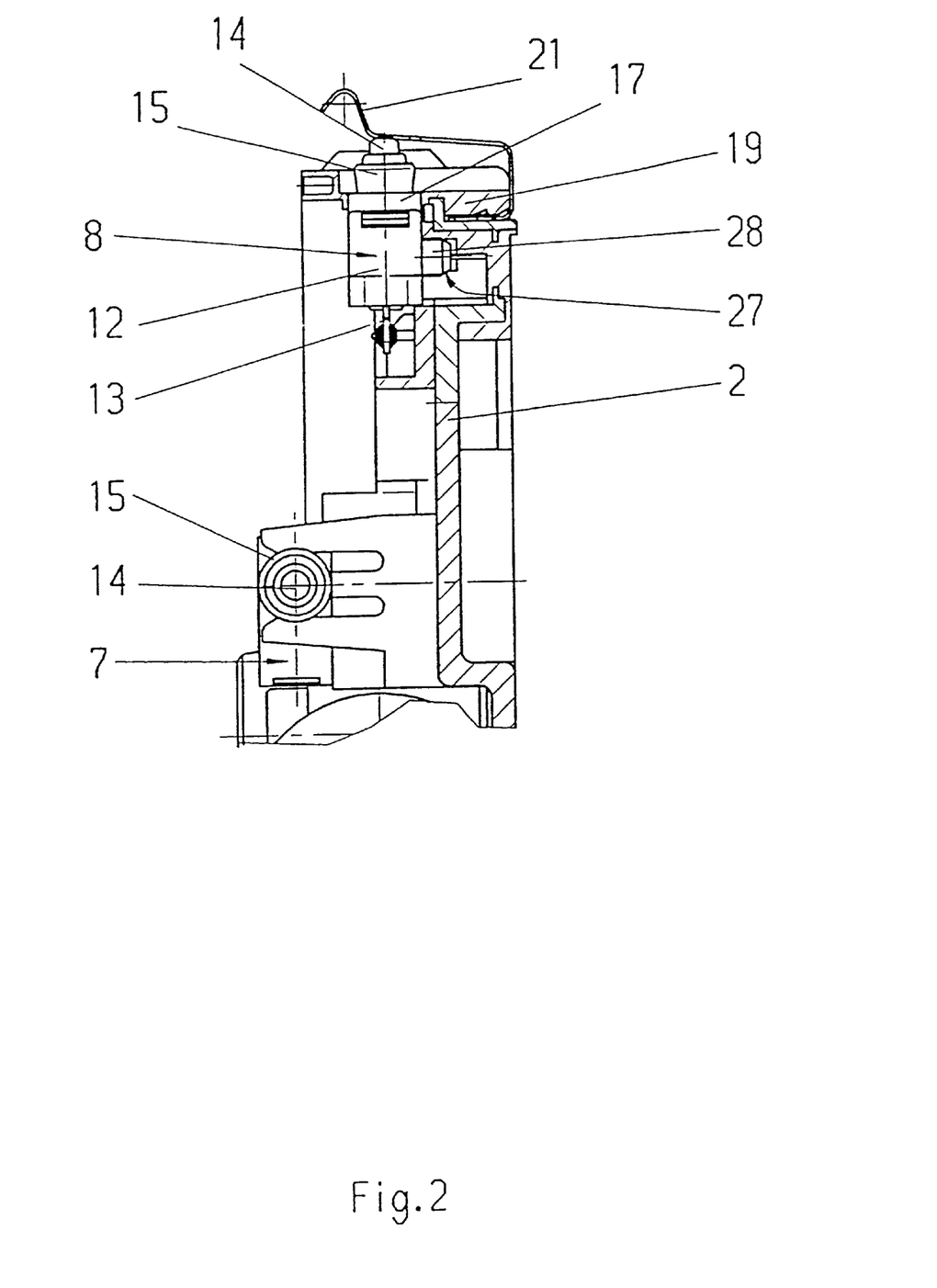
FIG. 2 shows a section along the line 2—2 from FIG. 1.

Located in the housing 2 are various mechanical, electric and electronic components which, however, are not further relevant to the actual invention and are therefore not shown in more detail. Inter alia, there may be arranged in the housing 2 a drive for the locking knob of the central locking system in the car door, an electric switch 7 located in the interior of the housing 2 being used for establishing the locked or unlocked position of the locking knob. The switch 7 is operated in one of the two positions of the locking knob by means of a bevel 6 on an actuating lever 11, which is operatively connected to the locking knob, is indicated only schematically and can be moved according to the arrow 3, so that the switch signal emitted by the switch 7 encodes the corresponding position of the locking knob. Located in the interior of the housing 2 is a further electric switch 8. This switch 8 is used to interrogate the position in which a rotary latch on the lock of the car door is located. The switch 8 is operated by an actuating element 18, which is located outside the housing 2, is operatively connected to the rotary latch and can be moved according to the arrow 4, and which is likewise indicated only schematically in FIG. 1, via an opening 20 made in a housing wall 19 of the housing 2. To this end, the actuating element 18 acts on the switch 8 via a spring lever 21 which is fastened on the housing 2 and can be seen in more detail in particular in FIG. 2.

The electrical connection between the switches 7, 8 and the other electrical and electronic components is produced by means of lines 9 in the interior of the housing 2. The lines 9 lead further to electric terminals 10 which project out of the housing 2 and, for the purpose of protection, are surrounded by a housing extension 5. The terminals 10 are used for the electrical connection of the subassembly 1 to further components of the motor vehicle.

The electric switches 7, 8 are snap-action or microswitches which are known per se. For example, one design for such a switch can be seen in more detail in section in FIG. 6. The switch 7, 8 has its own switch housing 12.

Figure 6:
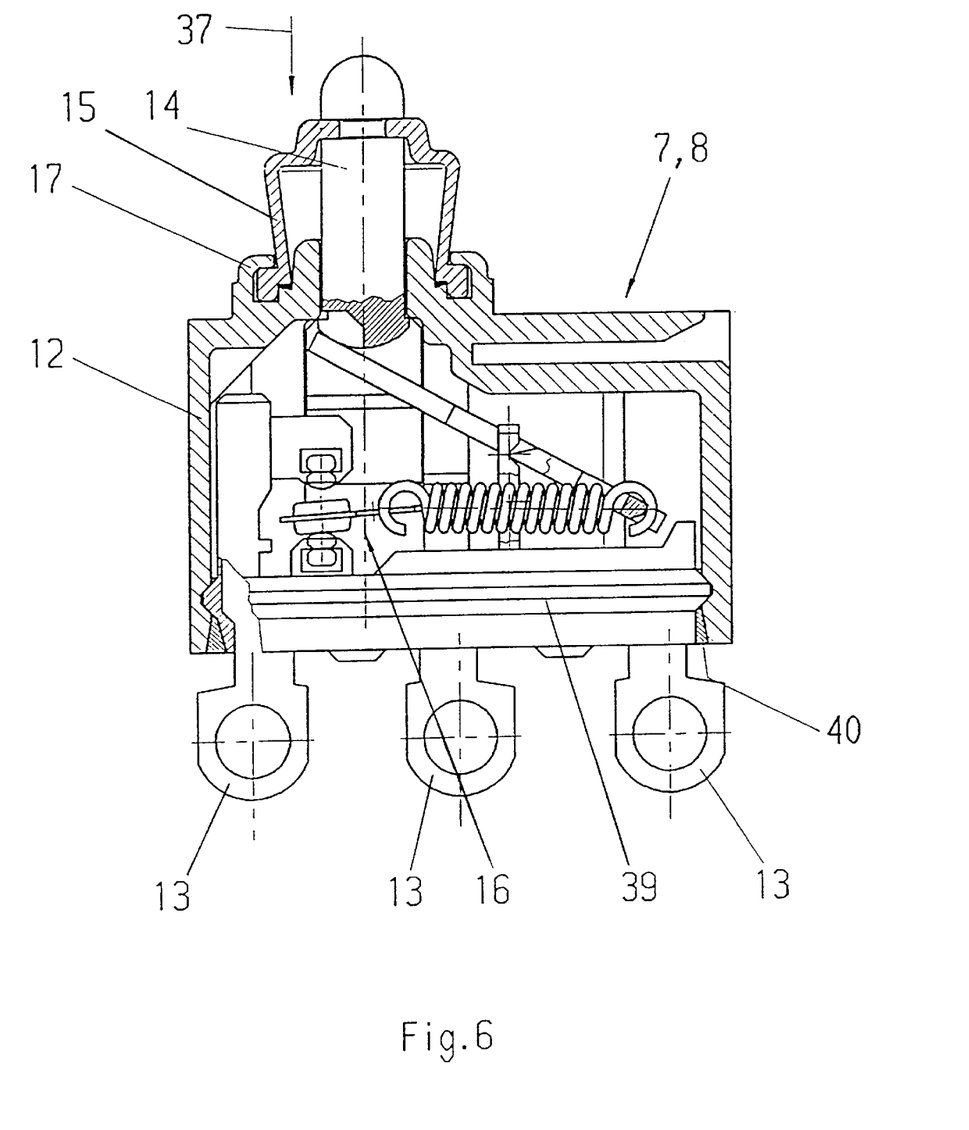
FIG. 6 shows a section through the electric switch according to line 6—6 from FIG. 5.

Located in the switch housing 12 is the contact system 16, which is electrically connected via terminals 13, for example soldering terminals, to the lines 9 shown in FIG. 1. The contact system 16 of the switch 7, 8 is switched by means of an operating member 14 which leads into the switch housing 12 and is designed as a linear plunger which is movable in the direction of arrow 37. The switch housing 12 of the switch 7, 8 is preferably designed to be inherently watertight and dust-tight. To this end, a sealing cap 15 configured in the manner of a bellows is fitted on the switch housing 12 in the region of the operating member 14. The sealing cap 15 can be fastened by means of a collar 17 on the switch housing 12, for example by means of rolling. A base 39 is inserted into the switch housing 12 on that side opposite the operating member 14, the gap between the base 39 and the switch housing 12 being additionally able to be sealed by means of a potting compound 40.

According to FIG. 1, the further switch 8 is arranged in the region of the housing wall 19 in the vicinity of the opening 20, to be precise in such a way that the operating member 14 passes through the opening 20 in the housing wall 19. As can be seen in more detail from FIG. 3, the switch 8 rests with a surface 22 of the switch housing 12, which surface is assigned to the operating member 14, directly on at least a part of the surface 23 of the housing wall 19 surrounding the opening 20. In an expedient manner, the surface 22 of the switch housing 12 is formed by a part of the collar 17. The surface 23 of the housing wall 19 is the circumferential rim of the opening 20 in the housing wall 19. By means of this design, in which the collar 17 rests all around on the housing wall 19 in the opening 20, sealing of the opening 20 is achieved by means of the switch 8 itself, without further sealing means being necessary, so that the penetration of moisture, dust or the like into the interior of the housing 2 at the opening 20 is effectively prevented. Moreover, such effects on the switch 8 itself are likewise ruled out, since the latter is provided in the region of the operating member 14 with the sealing cap 15.

Figure 3:
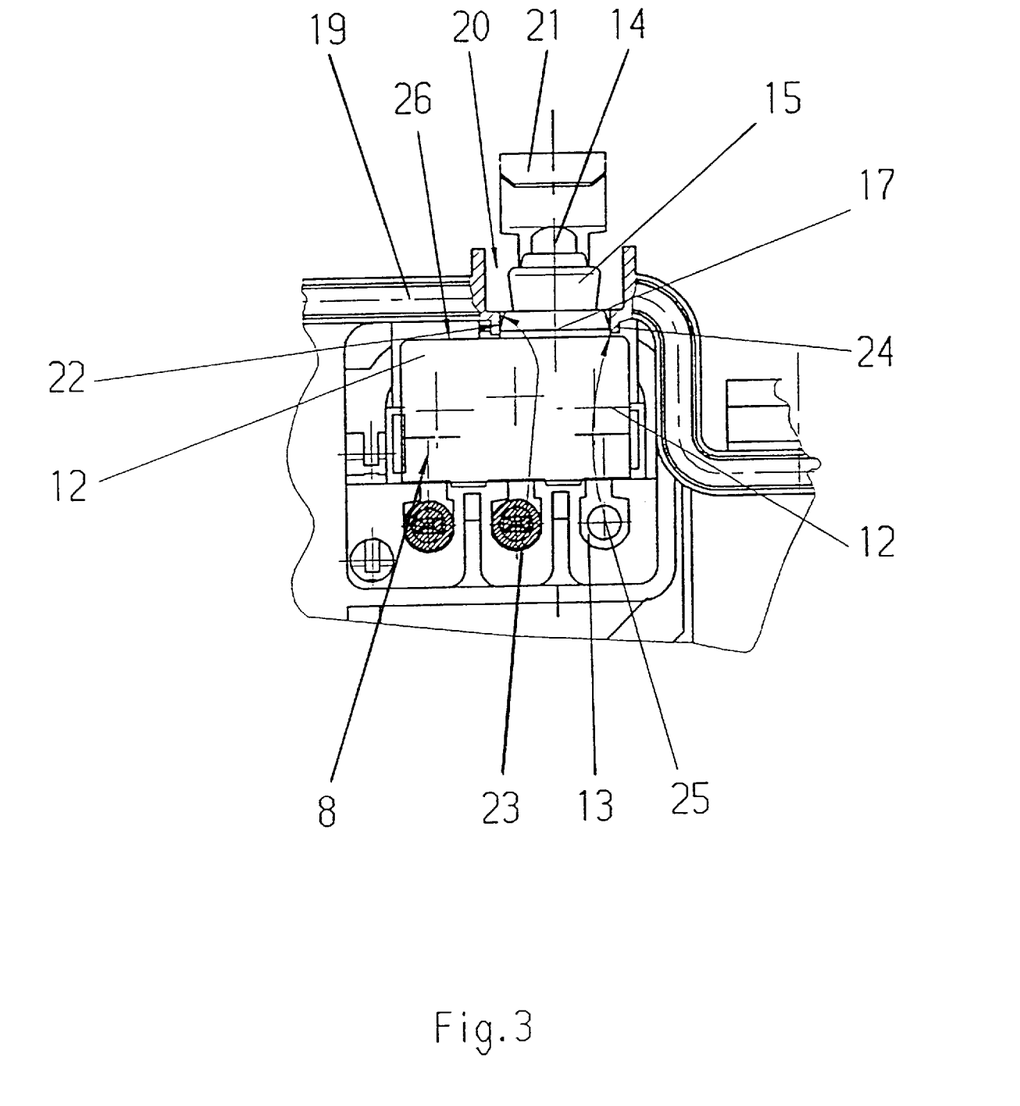
FIG. 3 shows an extract according to detail III from FIG. 1, on an enlarged scale.

In the preferred embodiment the outer surface of the collar 17 is designed to run obliquely, approximately in the manner of a truncated cone. The opening 20 has an approximately circular cross section, which corresponds to the collar 17. The opening 20 preferably has a slightly smaller diameter than the largest external diameter of the collar 17, as a result of which the surface 22 rests on the collar with a certain contact pressure on that surface 23 of the housing wall 19 surrounding the opening 20. This achieves particularly good sealing, even though the surface 22 on the collar 17 rests directly on this surface 23 without additional sealing means.

As is further apparent from FIG. 3, the surface 23 surrounding the opening 20 can be lengthened with an extension 24, reaching into the interior of the housing 2, on the housing wall 19. This produces an increased sealing surface in the opening 20. If appropriate, the extension 24 can additionally rest with its end face 25 on the surface 26 of the switch housing 12, which is approximately perpendicular to the direction of motion of the operating member 14 according to the arrow 37 from FIG. 6.

Figure 3A:
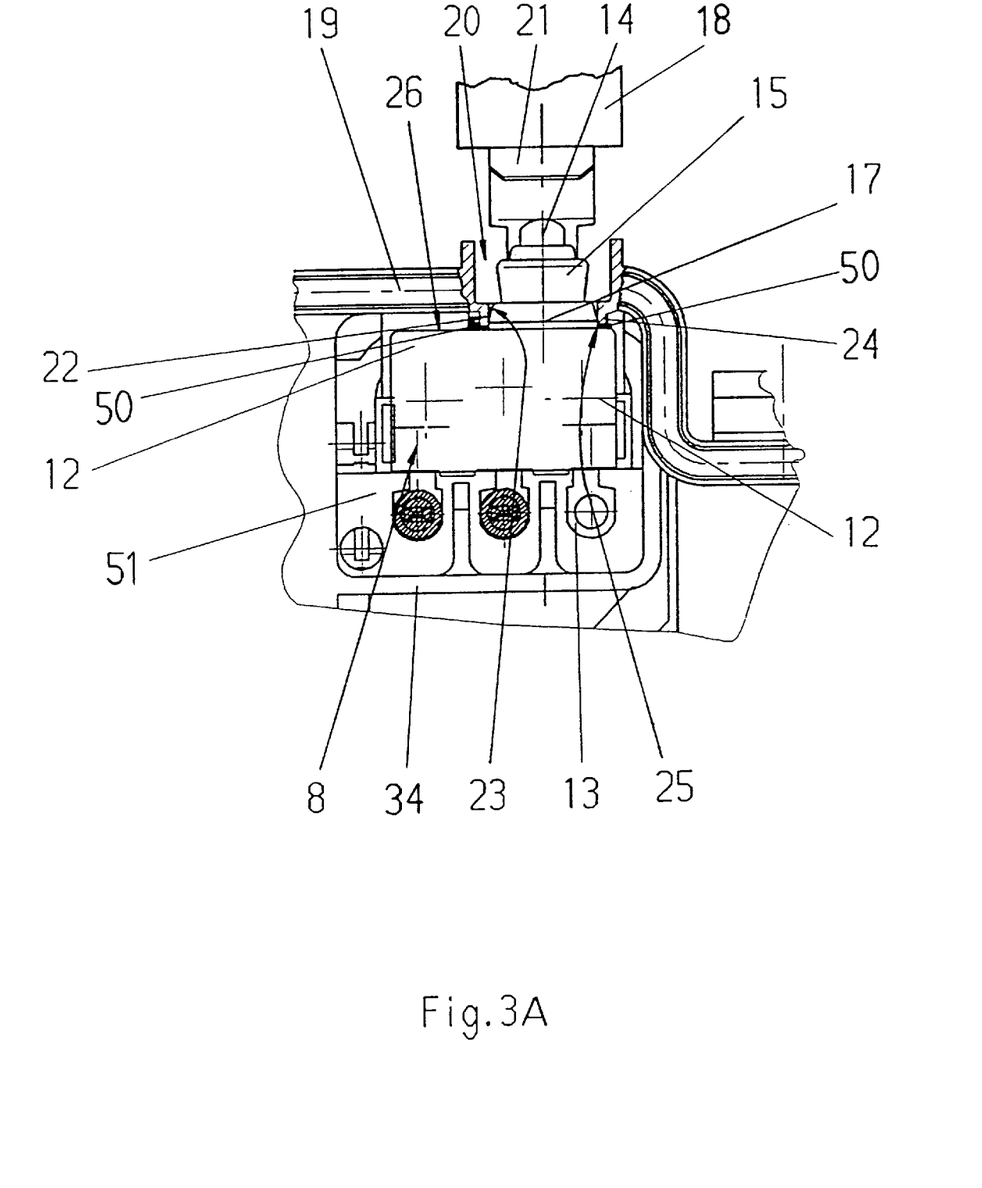
FIG. 3A is an enlarged view of FIG. 3 showing sealing element 50 and potting compound 51.

If desired, it is still further possible for a resilient sealing element, 50, to be additionally arranged between the end face 25 and the surface 26.

Figure 4:
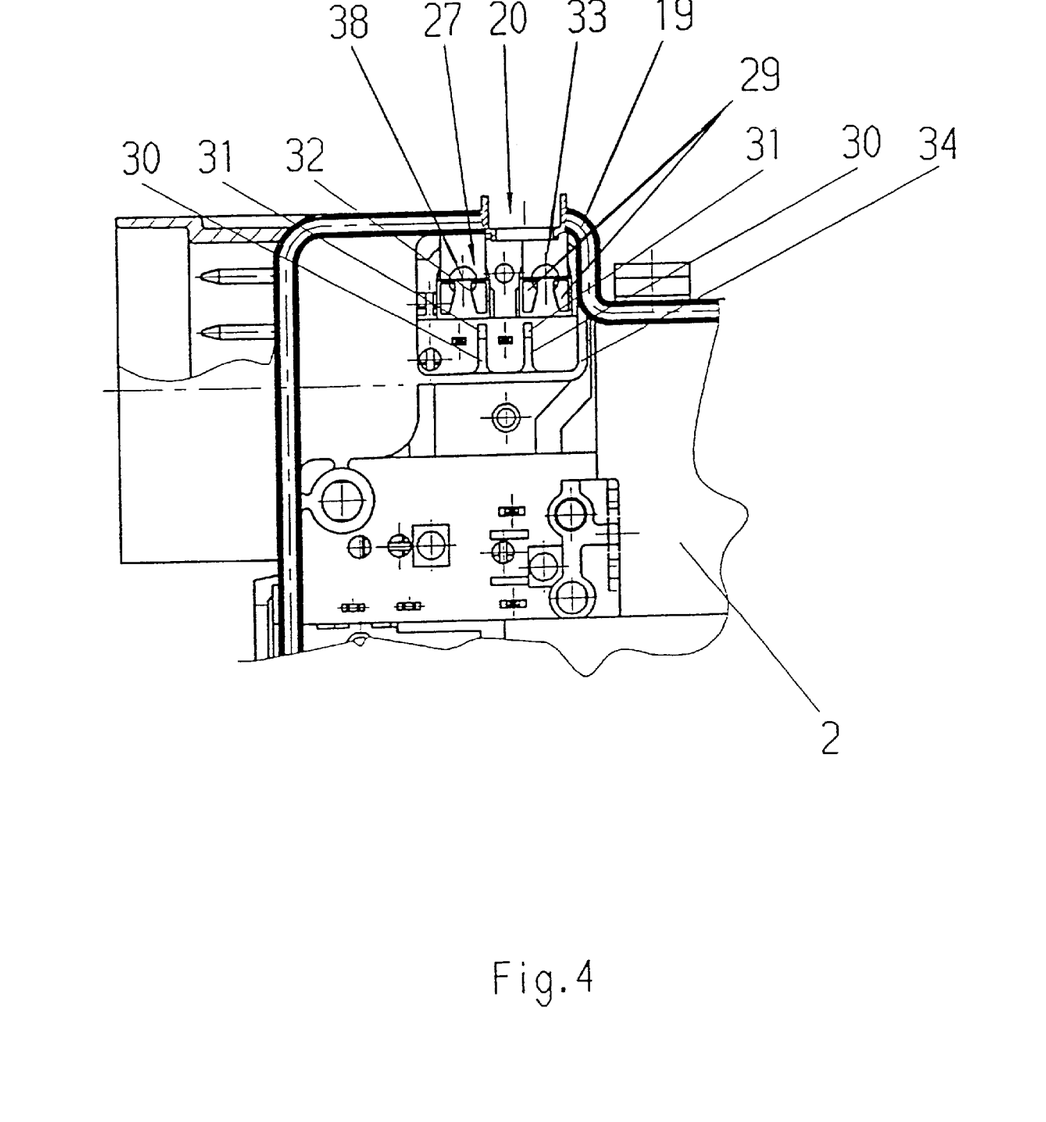
FIG. 4 shows the housing as in FIG. 1, but without electric components.
Figure 5:
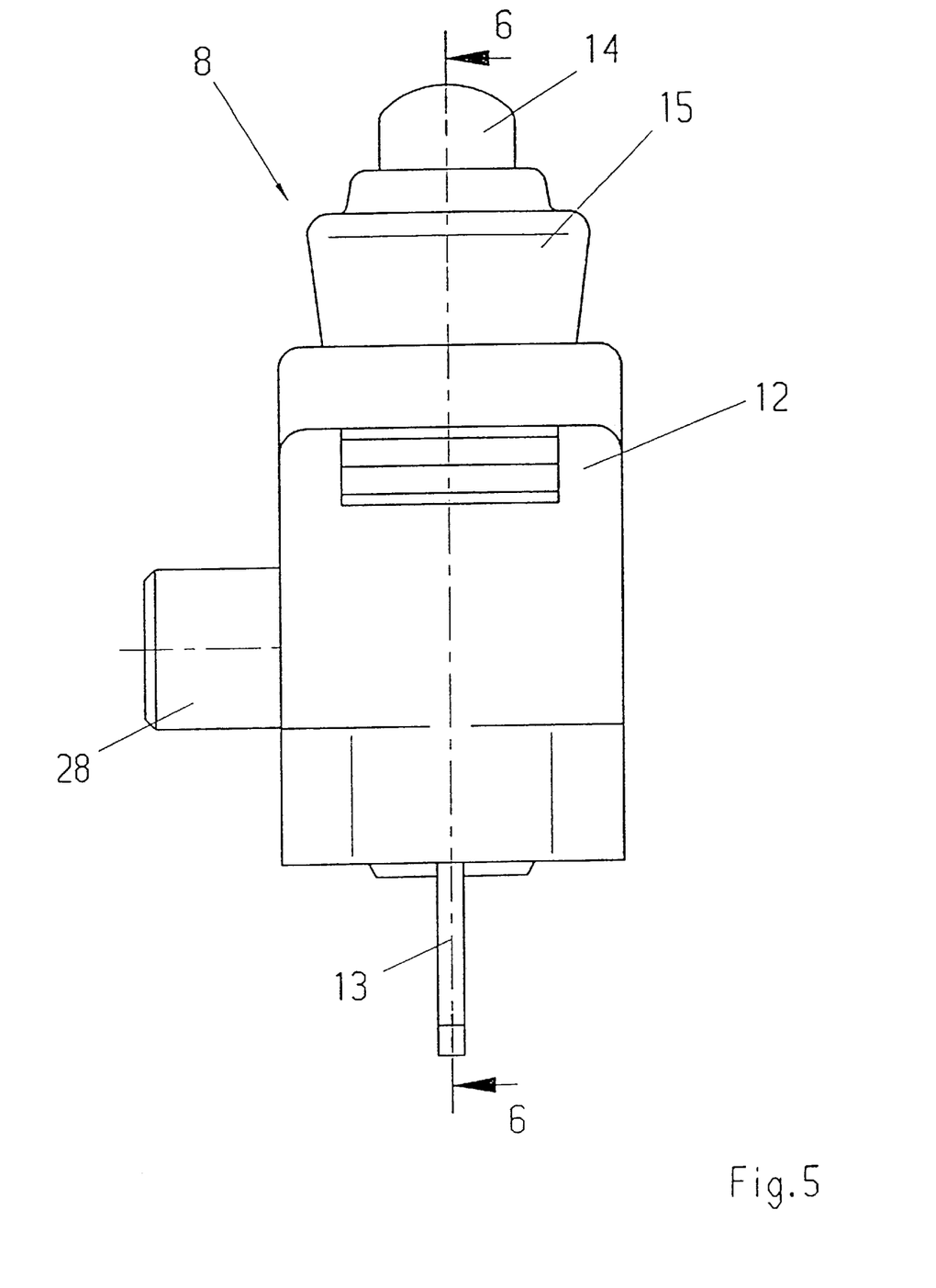
FIG. 5 shows a side view of an electric switch

On one side of the switch housing 12, the electric switch 8 has retaining pins 28, as can be seen in FIG. 5. In the present exemplary embodiment, the switch 8 has two such retaining pins 28. The switch 8 is held in the housing 2 by these retaining pins 28 in a retainer 27 shown in more detail in FIG. 4. The retainer 27 has latch holders 38 corresponding to the retaining pins 28. Preferably, the latch holder 38 for the retaining pin 28 is preferably designed in each case from two latching or snap-action hooks 29, which are approximately triangular with their tips 32 located opposite one another, and an approximately semicircular stop 33. The switch housing 12 is latched in in the correct position in the retainer 27, in that the two retaining pins 28 engage into the respective latch holders 38.

In order to make simple assembly of the switch 8 in the housing 2 possible, insertion bevels 31 designed in the manner of ribs 30 are made on the retainer 27 for the switch housing 12. For the purpose of assembly, the switch housing 12 is then placed onto the insertion bevel 31 such that the operating member 14 passes through the opening 20 in the housing 2. The switch 8 subsequently slides, as a result of the action of pressure on the switch housing 12, along the insertion bevel 31, the retaining pin 28, after overcoming a type of pressure point between the tips 32 of the latching or snap-action hooks 29, being fixed in the latch holder 38 by the stop 33 and the two latching or snap-action hooks 29.

According to a further feature of the invention, a rim 34 can be made along the retainer 27. After the switch 8 has been inserted into the retainer 27 and the electrical connection of the terminals 13 to the lines 9 has been produced, the switch housing 12 can then be provided with a potting compound 51 within the region which is bounded by the rim 34. In this case it can also be sufficient for the potting compound 51 to be applied at least in the region of the opening 20 on the retainer 27. Preferably, the opening 27 and the collar 17 on the switch housing 12 are dimensioned in such a way that, on the basis of capillary forces, the potting compound 51 can penetrate into the gap between the housing wall 19 and the collar 17 and can harden there. As a result, the sealing of the opening 20 in the housing 2 with respect to the outside can be still further improved.

Figure 7:
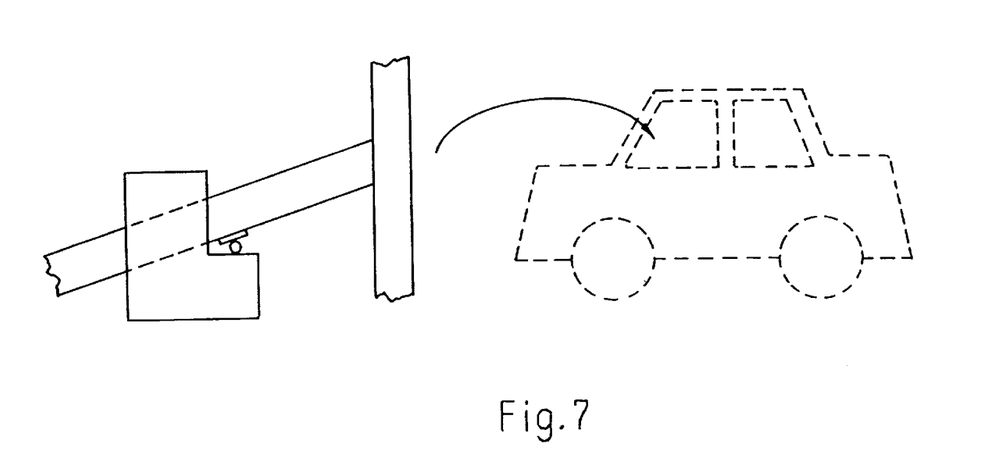
FIG. 7 illustrates a steering wheel lock in a motor vehicle including a subassembly according to the invention.
Figure 8:
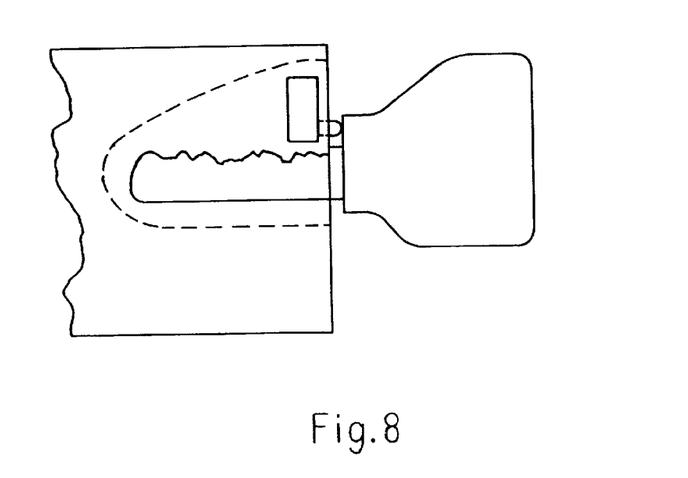
FIG. 8 shows an ignition lock in a motor vehicle including a subassembly according to the invention.
Figure 9:
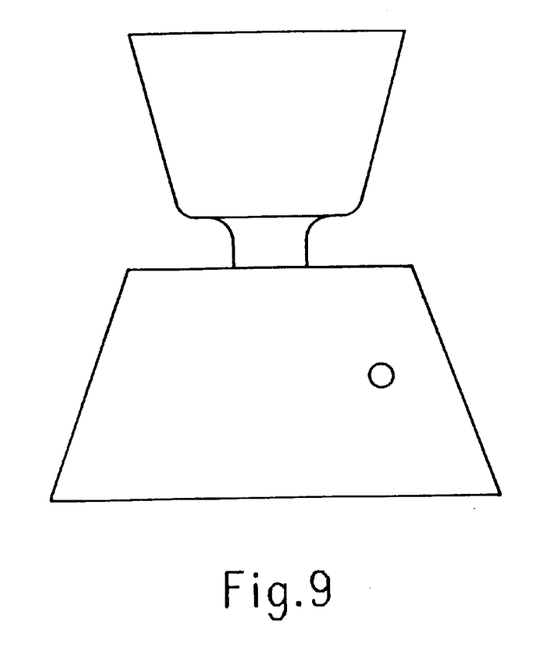
FIG. 9 is a representation of a domestic appliance including a subassembly according to the invention.
Figure 10:
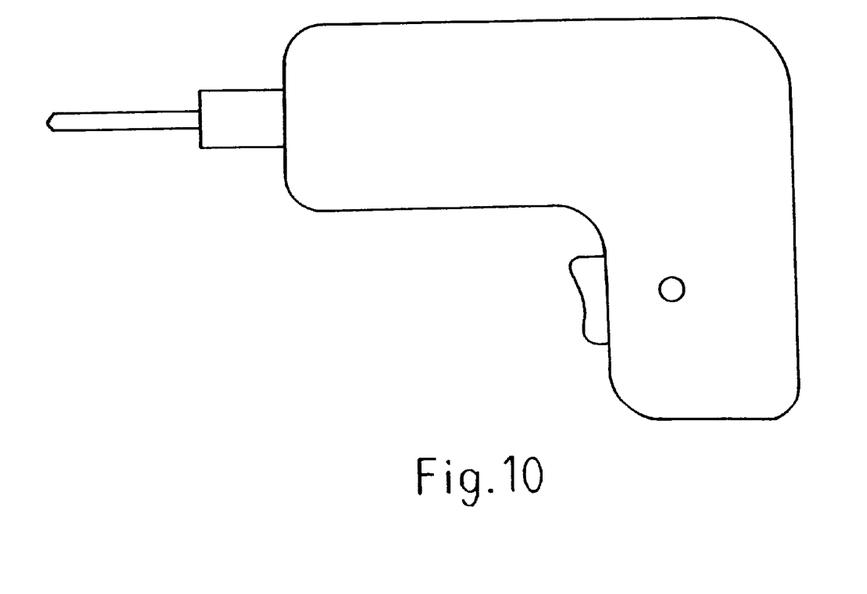
FIG. 10 is a schematic illustration of a machine tool including a subassembly according to the invention.

The invention is not restricted to the exemplary embodiment described and illustrated. On the contrary, it also comprises all the developments by those skilled in the art within the context of the idea of the invention. For example, a subassembly may be used in a steering wheel lock (FIG. 7) or an ignition lock (FIG. 8). Moreover, it is possible to use the invention not only in motor vehicles but also on other devices in which a subassembly in a housing contains a switch which is operated by actuating means located outside the housing, or is to be fixed in the housing in the correct position in a simple way. For example, in this case these may be subassemblies for electric domestic appliances (FIG. 9), machine tools (FIG. 10) or the like.

I claim:

1. A subassembly comprising a main housing, an electric switch arranged within said main housing and retaining means for holding said switch in said main housing, said retaining means including retaining pins and a corresponding latch holder, said main housing having a wall provided with an opening and said switch having a switch housing and an actuating element, said switch being arranged within said main housing such that said actuating element projects through said opening in said wall so as to extend exteriorly of said main housing and thus be actuatable from the exterior of said main housing, said wall having a first contact surface in a region of said opening and said switch housing having a second contact surface in a region of and surrounding said actuating element, said two contact surfaces being in pressure contact with each other when said switch is installed in said main housing with said actuating element of said switch projecting through said opening, thereby eliminating the need for an additional seal between said contact surfaces of said main housing and said switch housing.

2. A subassembly as defined in claim 1, wherein said actuating element of said switch is a linearly movable plunger and said switch further comprises a sealing cap surrounding said plunger and a collar for retaining said sealing cap, said collar having an outer surface which constitutes said second contact surface.

3. A subassembly as defined in claim 2, wherein said sealing cap is configured as a bellows.

4. A subassembly as defined in claim 2, wherein said opening of said wall is circular and has an inner surface, and said collar is configured as a truncated cone, the inner surface of said circular opening constituting said first contact surface and the outer surface of said cone constituting said second contact surface.

5. A subassembly as defined in claim 4, wherein said opening has a diameter which is slightly smaller than the largest external diameter of said collar.

6. A subassembly as defined in claim 1, comprising a sealing element which is independent of the seal effected by the interengagement of said first and second surfaces, said sealing element being positioned in the region of said opening and said actuating element and being interposed between an inner surface of said wall and an outer surface of said switch housing.

7. A subassembly as defined in claim 1, further comprising a retainer located on said switch housing to hold said switch in position in said main housing.

8. A subassembly as defined in claim 1, further comprising an insertion bevel designed in the manner of a rib and located on said retaining means for the switch housing, said latch holder for the retaining means having two triangular latching hooks located opposite one another and a semicircular stop, such that during assembly, said switch housing is placed onto said insertion bevel such that said actuation member passes through said opening in said main housing and subsequently, as a result of the action of pressure, said switch housing slides along said insertion bevel, said retaining pins, after overcoming a type of pressure point between the tips of said latching hooks, being fixed in said latch holder by said stop and said two latching hooks.

9. A subassembly as defined in claim 1, wherein said switch housing on said retaining means is provided with a potting compound in the region of said opening.

10. A subassembly as defined in claim 1, wherein said switch is a snap-action switch.

11. A subassembly as defined in claim 1, where said switch is a microswitch.

12. A steering wheel lock in a motor vehicle, comprising a subassembly as defined in claim 1.

13. An ignition lock in a motor vehicle, comprising a subassembly as defined in claim 1.

14. A door lock in a motor vehicle, comprising a subassembly as defined in claim 1.

15. A domestic appliance, comprising a subassembly as defined in claim 1.

16. A machine tool, comprising a subassembly as defined in claim 1.

* * * * *